(12) United States Patent
Thommana et al.

(10) Patent No.: US 10,116,382 B1
(45) Date of Patent: Oct. 30, 2018

(54) AD HOC HIGH FREQUENCY NETWORK

(71) Applicant: Rockwell Collins, Inc., Cedar Rapids, IA (US)

(72) Inventors: John Thommana, Cedar Rapids, IA (US); Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 65 days.

(21) Appl. No.: 15/442,002

(22) Filed: Feb. 24, 2017

(51) Int. Cl.
| | |
|---|---|
| *H04B 7/22* | (2006.01) |
| *H04B 7/185* | (2006.01) |
| *H04J 3/06* | (2006.01) |
| *H04W 64/00* | (2009.01) |
| *H04W 72/08* | (2009.01) |
| *H04W 72/04* | (2009.01) |
| *H04W 84/18* | (2009.01) |

(52) U.S. Cl.
CPC .............. *H04B 7/22* (2013.01); *H04J 3/0644* (2013.01); *H04W 64/003* (2013.01); *H04W 72/0453* (2013.01); *H04W 72/082* (2013.01); *H04B 7/1851* (2013.01); *H04B 7/18513* (2013.01); *H04B 7/18515* (2013.01); *H04B 7/18517* (2013.01); *H04W 84/18* (2013.01)

(58) Field of Classification Search
CPC .... H04B 7/22; H04B 7/1851; H04B 7/18513; H04B 7/18515; H04B 7/18517; H04J 3/0644; H04W 64/003; H04W 72/082; H04W 72/0453; H04W 84/18
See application file for complete search history.

(56) References Cited

U.S. PATENT DOCUMENTS

| | | | | |
|---|---|---|---|---|
| 2010/0073229 A1* | 3/2010 | Pattabiraman | .......... | G01S 19/11 342/357.64 |
| 2013/0051318 A1* | 2/2013 | Matsuo | .................. | H04B 15/02 370/328 |
| 2013/0063308 A1* | 3/2013 | Krasner | .................. | G01S 19/05 342/393 |
| 2014/0228045 A1* | 8/2014 | Belmonte | ............... | H04W 4/02 455/456.1 |
| 2014/0266884 A1* | 9/2014 | Raghupathy | .......... | H04W 56/00 342/357.63 |

(Continued)

*Primary Examiner* — Brian D Nguyen
(74) *Attorney, Agent, or Firm* — Angel N. Gerdzhikov; Donna P. Suchy; Daniel M. Barbieri

(57) ABSTRACT

High frequency (HF) communication devices and methods capable of supporting HF tactical communications are disclosed. A communication device may include a time source configured to provide timing information for the communication device, where the timing information is synchronized with other communication devices participating in the same network the communication device is configured to participate in. The communication device may also include one or more processors in communication with the time source. The one or more processors may be configured to facilitate beyond line of sight reflective communications between the communication device and another communication device participating in the same network, wherein the beyond line of sight reflective communications are carried out in a time synchronized manner and in accordance with a time division multiple access (TDMA) based waveform that supports time slots.

18 Claims, 7 Drawing Sheets

(56) References Cited

U.S. PATENT DOCUMENTS

| | | | |
|---|---|---|---|
| 2015/0043697 A1* | 2/2015 | Achanta | H04B 3/04 |
| | | | 375/371 |
| 2016/0033649 A1* | 2/2016 | Mathews | G01S 5/021 |
| | | | 342/357.48 |
| 2016/0100533 A1* | 4/2016 | Bauman | A01G 25/16 |
| | | | 700/284 |
| 2017/0374265 A1* | 12/2017 | Finlow-Bates | H04N 5/23203 |
| 2018/0011199 A1* | 1/2018 | Lombardi | G01S 19/235 |

* cited by examiner

AD HOC HIGH FREQUENCY NETWORK

BACKGROUND

Ad hoc high frequency communication systems, such as that described in U.S. Pat. No. 9,282,500, entitled "Ad Hoc High Frequency with Advanced Automatic Link Establishment System and Related Method" (which is hereby incorporated by reference in its entirety), can be utilized to provide ad hoc beyond line of sight high frequency (HF) radio frequency communications in various types of operating conditions. These ad hoc HF communication systems are typically configured to handle two nodes in communication (e.g., using traditional HF contention based waveforms). These nodes are typically configured to keep track of other potential nodes during idle periods and use the potential nodes as potential relays if the current communication link breaks. It is noted that configuring nodes in this manner may limit the total number of nodes that can be supported in the communication system. It is also noted that there are other performance issues associated with existing ad hoc HF communication systems.

SUMMARY

In one aspect, embodiments of the inventive concepts disclosed herein are directed to a communication device. The communication device may include a time source configured to provide timing information for the communication device, where the timing information is synchronized with other communication devices participating in the same network the communication device is configured to participate in. The communication device may also include one or more processors in communication with the time source. The one or more processors may be configured to facilitate beyond line of sight reflective communications between the communication device and another communication device participating in the same network, wherein the beyond line of sight reflective communications are carried out in a time synchronized manner and in accordance with a time division multiple access (TDMA) based waveform that supports time slots.

In a further aspect, embodiments of the inventive concepts disclosed herein are directed to a beyond line of sight reflective communication system. The beyond line of sight reflective communication system may include multiple communication nodes. Each particular communication node may include a time source configured to provide timing information for the particular communication node, were the timing information is synchronized with time sources of other communication nodes. The beyond line of sight reflective communication system may also include one or more processors in communication with the time source. The one or more processors may be configured to facilitate beyond line of sight reflective communications between the particular communication node and another communication node, wherein the beyond line of sight reflective communications are carried out in a time synchronized manner and in accordance with a time division multiple access (TDMA) based waveform that supports time slots.

In another aspect, embodiments of the inventive concepts disclosed herein are directed to a beyond line of sight reflective communication method. The method may include: providing timing information to a communication device, the timing information being synchronized with other communication devices participating in a same network the communication device is configured to participate in; and facilitating beyond line of sight reflective communications between the communication device and another communication device participating in the same network, wherein the beyond line of sight reflective communications are carried out in a time synchronized manner and in accordance with a time division multiple access (TDMA) based waveform that supports time slots.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
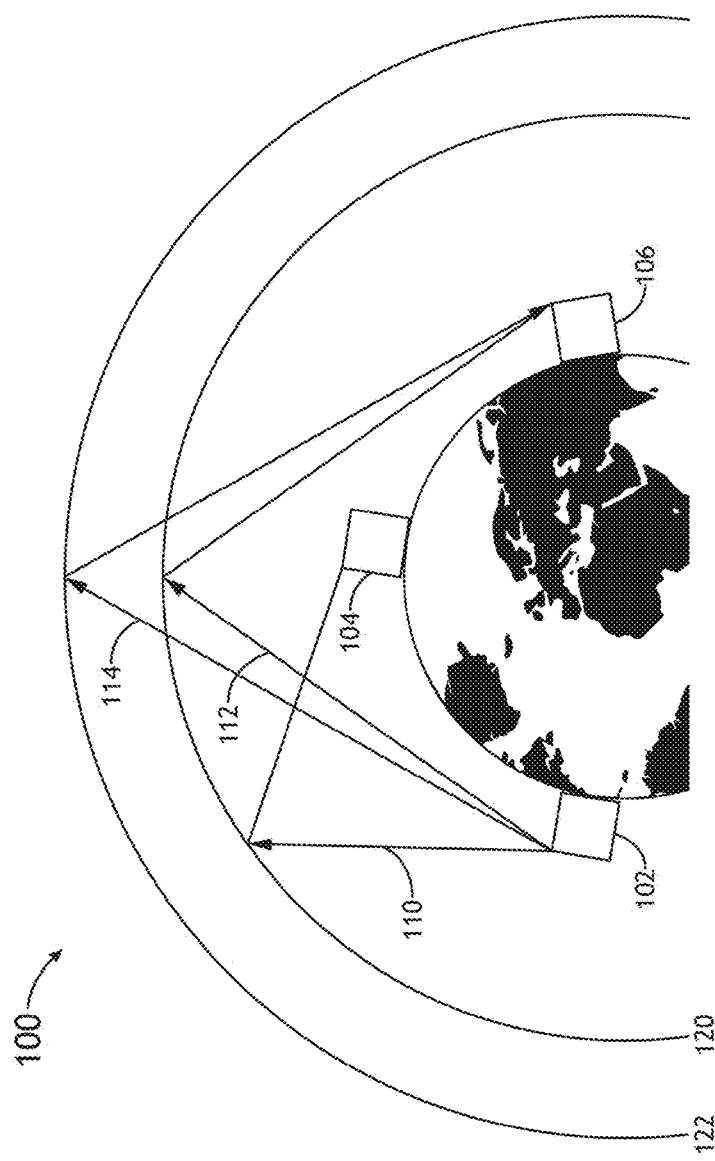
FIG. 1 is an illustration depicting a communication system configured in accordance with the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments of the inventive concepts disclosed herein are directed to high frequency (HF) communication systems and methods capable of supporting HF tactical communications. The communication systems and methods configured in accordance with embodiments of the inventive concepts disclosed herein may utilize a robust mesh networking waveform. In some embodiments, the waveform may be a time division multiple access (TDMA) based waveform that supports time slots. The time slots can be allocated to users statically and/or dynamically for different purposes, including transmissions of data, voice, situational awareness, network management, as well as other overhead information. It is noted that a TDMA based waveform (which has the concept of time slots, groups of slots referred to as frames, and groups of frames referred to as epochs) is different from a conventional point to point contention based waveform (which does not depend on the knowledge of time). It is contemplated that a TDMA based waveform may be better suited to support a large number of nodes and may provide improved efficiency and resource allocation compared to a conventional contention based waveform.

Figure 2:
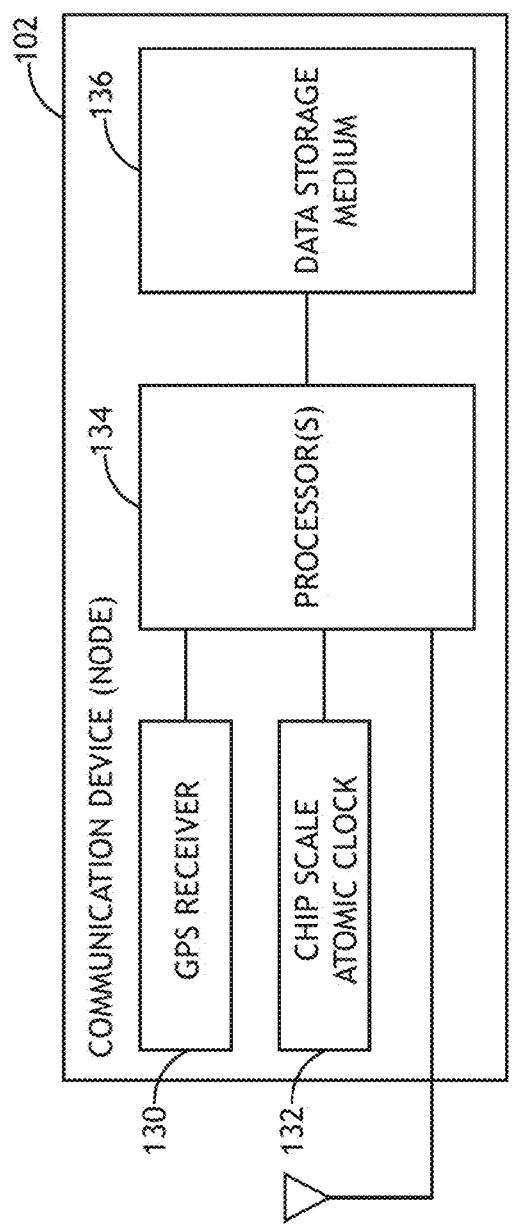
FIG. 2 is a block diagram depicting a communication device according to an exemplary embodiment of the inventive concepts disclosed herein.

Referring generally to FIGS. 1 and 2. FIG. 1 is a diagram depicting a communication system 100 configured in accordance with the inventive concepts disclosed herein. FIG. 2 is a simplified block diagram depicting a node (102, 104, or 106) participating in the communication system 100. The communication system 100 may be configured to utilize various layers of the ionosphere to reflect signals and facilitate beyond line of sight reflective communications. For instance, a first node 102 may emit a first signal 110, which may be reflected off of a first layer 120 of the ionosphere for delivery towards a second node 104. The first node 102 may also emit a second signal 112 (e.g., emitted at a different angel), which may be reflected off of the first layer 120 of the ionosphere for delivery towards a third node 106. Alternatively, the first node 102 may emit a third signal 114 (e.g., emitted at a different frequency), which may be reflect off of a second layer 122 of the ionosphere for delivery towards the third node 106.

It is noted that the various nodes 102-106 participating in the communication system 100 may be large distances (e.g., 6000 nautical miles) apart. To facilitate communications among these nodes 102-106, it may be beneficial for every node 102-106 in the communication system 100 to be time synchronized and ensure that every node 102-106 listens and transmits at the appropriate times. In some embodiments, time synchronization can be achieved using timing information received from a navigation satellite system based time source 130 (e.g., using a Global Positioning System (GPS) receiver). Chip Scale Atomic Clock (CSAC) 132 may also be utilized to provide additional timing information. It is contemplated that using time synchronization provided by GPS coupled with additional timing information provided by CSAC may allow the nodes 102-106 to remain operational even if the time source 130 fails (e.g., loses GPS signals). In other words, it is contemplated that the timing information provided by CSAC 132 can maintain time accuracies for a period of time (e.g., two weeks or more) without GPS, providing a feature that may be appreciated in various types of system, including tactical communication systems. It is also contemplated that the timing information provided by CSAC 132 can be reinitialized once GPS signals become available again.

It is further contemplated that each node (referenced as node 102 for simplicity) may include one or more processors 134 (e.g., implemented as a dedicated processing unit, an application-specific integrated circuit (ASIC), a field-programmable gate array (FPGA), or an integrated component of an existing hardware or firmware configured to control operations of the node) configured to help select appropriate communication frequencies. It is noted that selecting a communication frequency between two nodes can be very complex because it depends on the current locations of the nodes, time of day, Smoothed Sunspot Number (SSN), transmit power, transmit/receive path gain/loss, and various other factors. The key to reliable HF communication is for the transmitting node (may be referred to as the transmitter) to find a frequency that reflects off the appropriate layer of the ionosphere toward the vicinity of the receiving node (may be referred to as the receiver). In a communication system (may be referred to as a network) having many nodes separated by varying distances, it may be particularly challenging to find a single frequency that will work for all nodes involved in the communication system (network). As a result, the network may be implemented as a collection of multiple point to point subnetworks each operating on a unique frequency. These subnetworks may be stacked in time so that they can coordinate between subnetworks if needed using a frequency that is not necessarily the same as the one they were using for their point to point communication.

Figure 3:
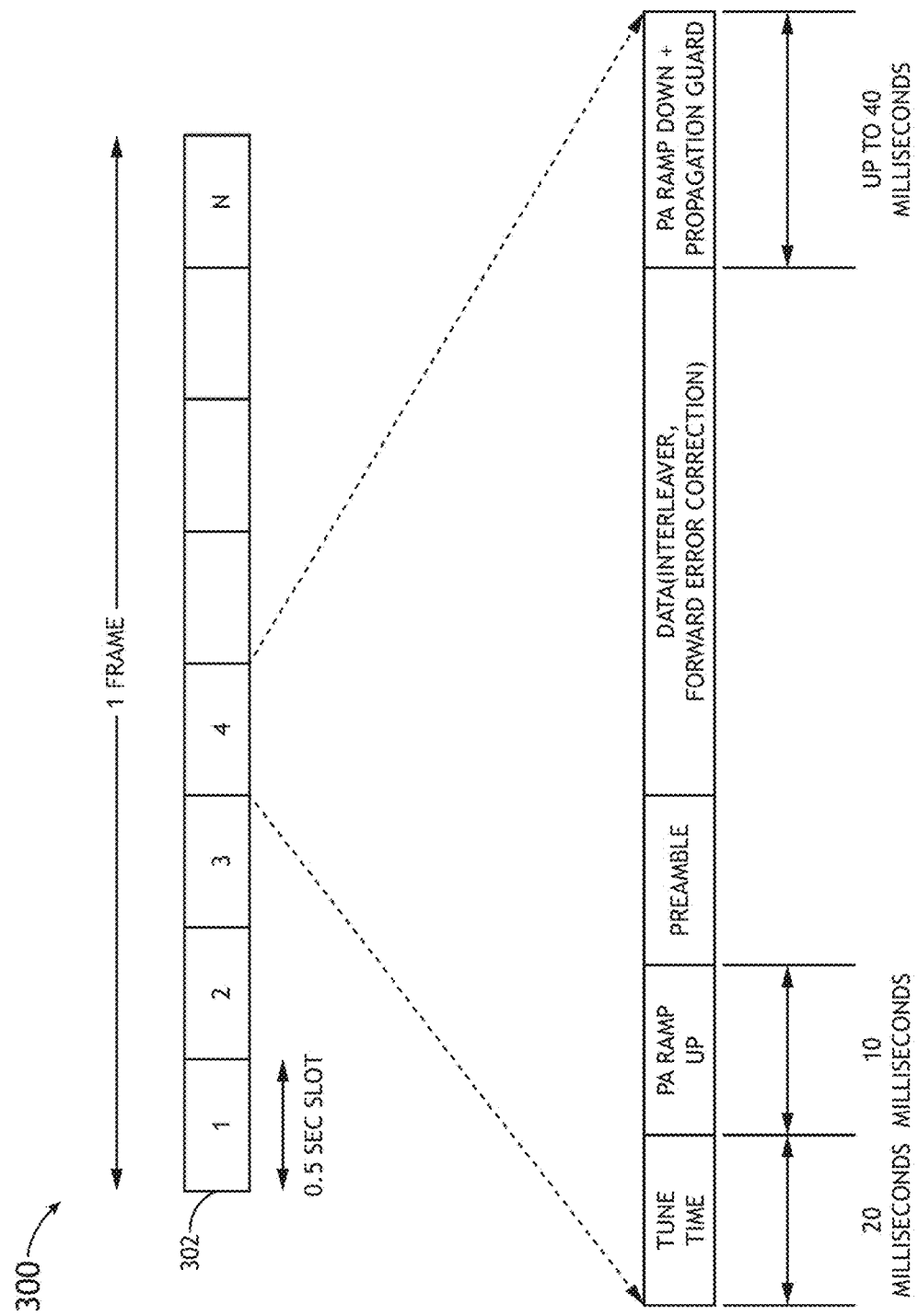
FIG. 3 is an illustration depicting a slot and frame structure according to an exemplary embodiment of the inventive concepts disclosed herein.

Referring now to FIG. 3, an illustration depicting a slot and frame structure 300 utilized in a communication system (network) configured in accordance with the inventive concepts disclosed herein is shown. In some embodiments, the time slots 302 in a frame 300 are classified into two types: data slots and overhead slots. Overhead slots are preassigned during mission planning and are known to every subnetwork in the network. Data slots can be statically and/or dynamically allocated using a slot allocation protocol. Data slots may be used to transmit voice, data, or voice and data. Overhead slots may be used for network management, subnetwork coordination, relative navigation and location updates.

Each slot 302 may be configured to have a predetermined duration. Generally, a shorter duration means that each node may have a better chance to request for a slot 302. A longer duration, on the other hand, means that each slot 302 may be able to carry more data. It is to be understood that while the slots 302 in FIG. 3 have durations set to 0.5 seconds (with 20 milliseconds allocated for coupler tune time, 10 milliseconds allocated for power amplifier ramp-up time, up to 40 milliseconds allocated for propagation guard and ramping down of the power amplifier, and the rest allocated for preamble and data transmission), such a depiction is merely exemplary and is not meant to be limiting. It is contemplated that the slots 302 may be configured to have different durations without departing from the broad scope of the inventive concepts disclosed herein.

It is noted that the inclusion of the overhead for tune time may be beneficial because it allows every time slot 302 configured in this manner to be usable by any node to communicate on any frequency. It is also noted that every data transmission in the slot 302 is preceded by a preamble. In some embodiments, the preamble in every slot 302 is uniquely determined (e.g., determined using a pseudorandom code that is dependent on the time-varying slot number). It is contemplated that having unique preamble in every slot 302 may help prevent message spoofing or denial of service attacks.

As mentioned previously, a communication system (network) configured in accordance with the inventive concepts disclosed herein may be implemented as a collection of multiple point to point subnetworks each operating on a unique frequency. A network configured in this manner may allow a particular node in a particular subnetwork to find another node in another subnetwork by periodically sending a location update message on every frequency in that particular node's frequency pick list. For instance, in some embodiments, all nodes in the network may have the same frequency pick list (e.g., stored in a data storage medium 136 shown in FIG. 1). A transmitting node may pick a frequency to broadcast its location update using a pseudorandom algorithm to receiving nodes that selected the matching frequency. If a receiving node can hear the location update, then the receiving node knows that it can communicate with the transmitting node on that frequency. In some embodiments, location update messages may include information about the sender (e.g., node id, node type, latitude, longitude, and heading information) and information about sender's neighbors (e.g., direct (1-hop) and indirect (2-hop) neighbors).

It is contemplated that as the number of nodes increases, a resource (slot) overhead problem may arise and may need to be addressed. For illustrative purposes, suppose there are 10 nodes participating in an HF network, and further suppose that each node has a 10-frequency pick list. Every node in this example needs 90 receive slots to hear from the other 9 nodes on all 10 frequencies. This means that the total number of slots needed in a location update epoch is 90×10=900 slots, which would severely impact the data throughput of the network.

To reduce the impact of the location update, each node 102-106 participating in the HF network may be configured with abilities to receive multiple transmissions on multiple frequencies. It is noted that there are many techniques that can be used to receive multiple channels (frequencies) simultaneously. Since these techniques are well understood by those skilled in the art, detailed explanations of these techniques are not repeated in the present disclosure. It is to be understood that utilizing these techniques to provide the nodes abilities to receive multiple transmissions on multiple frequencies may help reduce the overhead issue described above.

For instance, continuing with the reference to the example provided above, each node participating in the network may be allocated 10 slots for location update messages and the other 9 nodes may be configured to pick a frequency from the pick list (which may be staggered to prevent frequency selection collision) to send a location update. Every node may be allocated a receive slot in every frame for receiving a location update message. It is noted that during this receive slot, all other participating nodes in the network may pick a frequency from the frequency pick list and transmit a location update message. After a given number of frames (defined an epoch), every node in the network will have transmitted the location update to every other node on every frequency in the pick list at least once (and in some instances more than once). Multiple frequencies in the pick list may propagate between two users and may provide additional redundancy and robustness. Consequently, the network only needs 100 slots in an epoch instead of 900 slots previously described. In other words, a 9-times reduction is realized in terms of the number of location update slots (overhead) needed, effectively overcoming the overhead problem described above and allowing the network to support a large number of nodes.

In some embodiments, all nodes in the network are configured to send out (broadcast) periodic location updates. This allows each node to hear from its direct connection (1-hop) neighbor in every broadcast. Connectivity map of 1-hop neighbors enables each node to create a rudimentary network connectivity map/topology. Full network connectivity map/topology can therefore be obtained as the nodes can share/report their direct connection (1-hop) neighbors and their indirect connection (2-hop) neighbors. In some embodiments, a switch mechanism (e.g., a software switch) may be implemented to select between 1-hop and 2-hop reporting, which may provide the ability to limit the payload size of the location update messages.

In some embodiments, the content of the location update message may include sender information, fixed site reception, and direct connection neighbors. The sender information may have 48 bits, including 8 bits node identifier, 3 bits node type, 16 bits latitude, 16 bits longitude, and 5 bits heading. The fixed site reception may have 32 bits, including 16 bits representing up to 16 direct reception fixed site nodes and 16 bits representing up to 16 indirect reception fixed site nodes. The direct connection neighbors may follow different formats. In some embodiments, the direct connect neighbors may include 8 bits representing the number of entries (e.g., maximum of 10 entries) and each entry may include 8 bits representing only the identifier of a neighbor. Alternatively, each entry may include 48 bits containing the full node information of the neighbor.

Suppose, for illustrative purposes, that the direct connect neighbors contains only the identifiers of neighbors (making the direct connect neighbors 88 bits long), the resulting location update message is therefore 168 bits long. With a 32-bit header added to every message, each location update message is 200 bits long. The slot size therefore has to be selected such that at least a 200-bit payload can be supported. If the network is allocated wider bandwidths or uses higher order modulation, then option to send node information of the neighbors may be selected instead of just the identifier. It is to be understood that the examples provided above are merely exemplary and are not meant to be limiting. It is contemplated that location update messages may be formatted differently and may contain various fields having various different length without departing from the broad scope of the inventive concepts disclosed herein.

It is also contemplated that other approaches may be provided to facilitate communications among the nodes participating in the network. For instance, a mission relationship list may be defined whereby every node is allocated a set of nodes that they have to maintain connectivity with. Periodically a node may send a query message to all its direct neighbors to see if they still have connectivity with a specific node or set of nodes. The neighbor may then respond with the 48-bit node information if it has connectivity with the specific node or set of nodes. It is noted that this approach has fewer overheads because the location update message is smaller and only keeps track of direct neighbors. If the SSN is known and the 48-bit node information is available, then every node can run a coverage analysis (e.g., using Voice of America Coverage Analysis Program (VOACAP) HF coverage prediction) to determine the best frequency to use to communicate with that node.

Consequently, after a specific number (e.g., between 2 and 5) of location update epochs, every node may have a small set of nodes (direct and indirect) to track. After this period the nodes may just be interested in knowing if any new node is joining the network and how soon the connectivity with the known nodes are changing. The one or more processors located on each node may implement a topology manager, which may periodically run VOACAP for all direct and indirect nodes to determine which frequency or frequencies propagate and can initiate pings (queries) to ensure connectivity exists instead of running location updates at the specified rate. When VOACAP detects that link break is imminent, a more optimal frequency may be negotiated. It is recognized that sometimes it is possible that none of the frequencies in the pick list is optimal. If this happens, the nodes can negotiate an emergency set of (one or more) frequencies that are reserved for emergency situations. This feature can be made configurable so that it will be exercised only when necessary.

Figure 4:
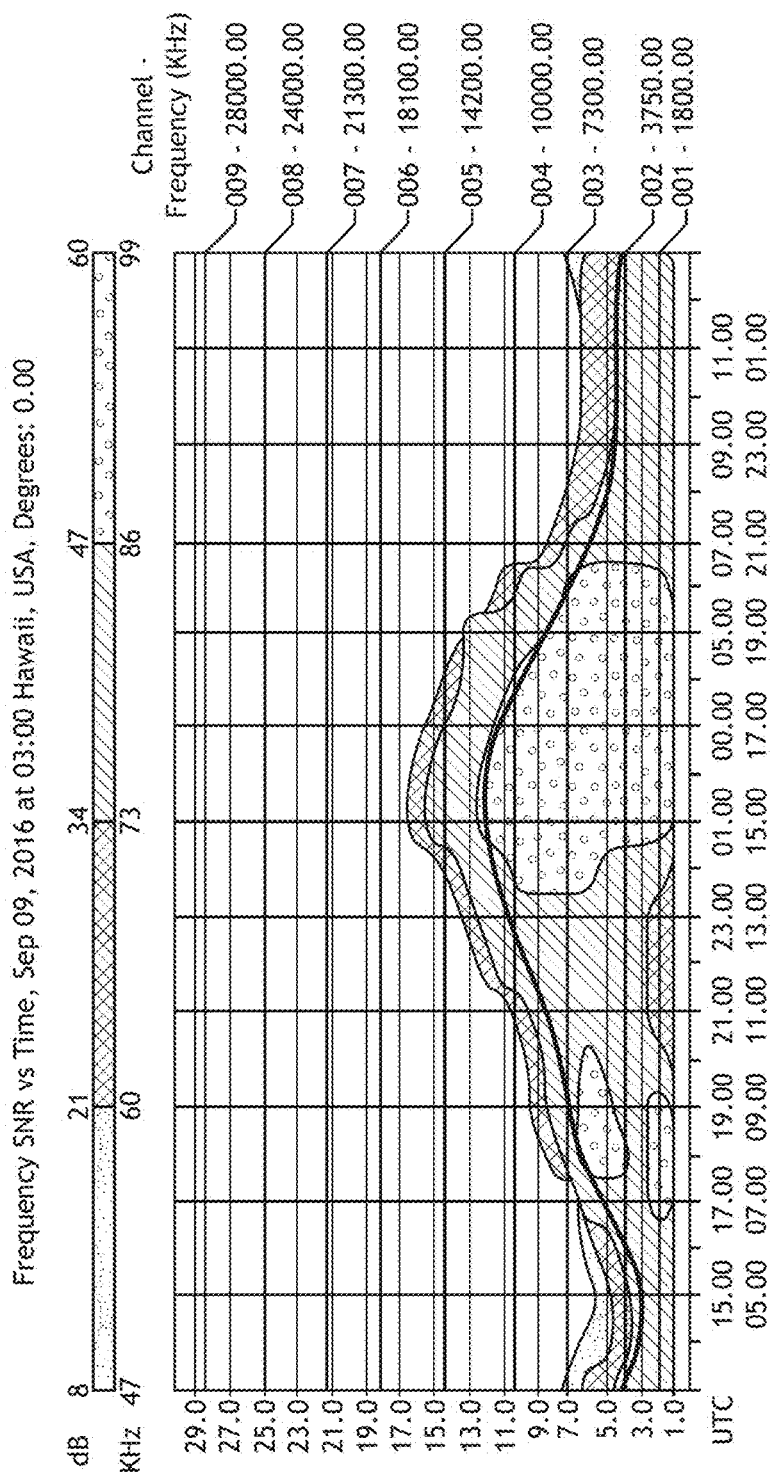
FIG. 4 is a graph of frequency versus time and associated high frequency (HF) propagation usable as provided by HF coverage prediction.

It is noted that since the reflections off the ionosphere are broad, communication between two nodes using the same frequency is possible even if one node moves ±100 miles. In other words, the same set of frequencies may be utilized to propagate between two nodes even if their locations drift by about 100 miles with less than 2 dB in signal to noise ratio (SNR) degradations. Referring to FIG. 4, a graph of frequency versus time and associated HF propagation usable as provided by VOACAP HF coverage prediction is shown. It can be seen from FIG. 4 that there is already a 10+dB SNR range factored into the propagation calculations and variations of 2 dB does not change the result substantially. It is therefore contemplated that a node A can use the last known location update of another node B (e.g., an airborne platform) to facilitate communication between them as long as the distance between them does not vary by more than 100 miles. If the node B moves at 600 miles per hour (or 100 miles in 6 minutes), an update every 3 minutes will ensure that the VOACAP computations are valid even if the node A uses the last location update provide by the node B. In practice, the location update time may be configured to be even longer because heading and velocity information is also available and approximate location of the platform can be computed based on the last location update.

The following table is an illustration showing that a network configuration of 0.25 second time slots, 1 minute frame and 10 minute epochs is adequate to support up to 40 user nodes.

| | | | | | |
|---|---|---|---|---|---|
| Frequencies in Picklist | 10 | 10 | 10 | 10 | 10 |
| Slot Duration (seconds) | 0.25 | 0.5 | 0.75 | 1 | 2 |
| Frame Duration (seconds) | 60 | 60 | 60 | 60 | 60 |
| Frame Duration (minutes) | 1 | 1 | 1 | 1 | 1 |
| Epoch Duration (seconds) | 600 | 600 | 600 | 600 | 600 |
| Epoch Duration (minutes) | 10 | 10 | 10 | 10 | 10 |
| Number of Slots/Frame | 240 | 120 | 80 | 60 | 30 |
| % Average Allocated to Overheads | 20% | 20% | 20% | 20% | 20% |
| Number of Slots/Frame for Overhead | 48 | 24 | 16 | 12 | 6 |
| Number of Slots/Frame for RTT | 2 | 2 | 2 | 2 | 2 |
| Number of Slots/Frame for Net Management | 6 | 6 | 6 | 6 | 6 |
| Number of Slots/Frame for Loc Update | 40 | 16 | 8 | 4 | −2 |
| Number of Nodes/Network | 40 | 16 | 8 | 4 | −2 |

The following table is an illustration showing that a network configuration of 0.25 second time slots, 2 minute frame and 20 minute epochs is adequate to support more user nodes.

| | | | | | |
|---|---|---|---|---|---|
| Frequencies in Picklist | 10 | 10 | 10 | 10 | 10 |
| Slot Duration (seconds) | 0.25 | 0.5 | 0.75 | 1 | 2 |
| Frame Duration (seconds) | 120 | 120 | 120 | 120 | 120 |
| Frame Duration (minutes) | 2 | 2 | 2 | 2 | 2 |
| Epoch Duration (seconds) | 1200 | 1200 | 1200 | 1200 | 1200 |
| Epoch Duration (minutes) | 20 | 20 | 20 | 20 | 20 |
| Number of Slots/Frame | 480 | 240 | 160 | 120 | 60 |
| % Average Allocated to Overheads | 20% | 20% | 20% | 20% | 20% |
| Number of Slots/Frame for Overhead | 96 | 48 | 32 | 24 | 12 |
| Number of Slots/Frame for RTT | 2 | 2 | 2 | 2 | 2 |
| Number of Slots/Frame for Net Management | 6 | 6 | 6 | 6 | 6 |
| Number of Slots/Frame for Loc Update | 88 | 40 | 24 | 16 | 4 |
| Number of Nodes/Network | 88 | 40 | 24 | 16 | 4 |

As will be appreciated from the above, networks configured in accordance with embodiments of the inventive concepts disclosed herein are capable of supporting a large number of nodes participating in beyond line of sight reflective communications. It is contemplated that networks configured in accordance with embodiments of the inventive concepts disclosed herein may be further configured to address other issues associated with conventional networks that use contention based waveforms.

For instance, it is noted that conventional networks lack the ability to interrupt a transmission in progress as the receiving node (receiver) is blind during transmission. Because networks configured in accordance with embodiments of the inventive concepts disclosed herein use a TDMA based waveform, an interruption mechanism can be implemented to interrupt a transmission in progress at time slot boundaries. Since a TDMA transmission is bounded within the time slot boundary, a node can interrupt another node at slot boundaries even if the next slot is not assigned to the interrupting node.

Suppose, for illustrative purposes, there is a 20-minute continuous data transmission to be communicated via the network. In a contention waveform based network, the transmitting node (transmitter) may start with sending a long preamble and then keep on transmitting till it runs out of data and the receiver has no choice but to wait till the current transmission is over. In a TDMA waveform based network, the receiver can interrupt the transmitter at slot boundaries. It can be seen from FIGS. 3 and 5 that every time slot has a time period allocated for propagation guard to accommodate possible propagation delays and ramping down of the power amplifier. The transmitter may finish transmitting and may require about 5 milliseconds to ramp down the power amplifier. The transmitter may sit idle after that till the beginning of the next time slot. Another node (an interrupting node) may therefore be allowed to interrupt a transmitter if the interrupting node can send a specific (interrupt) preamble to the transmitter after the power amplifier ramp down is completed and before the next transmission begins.

Figure 5:
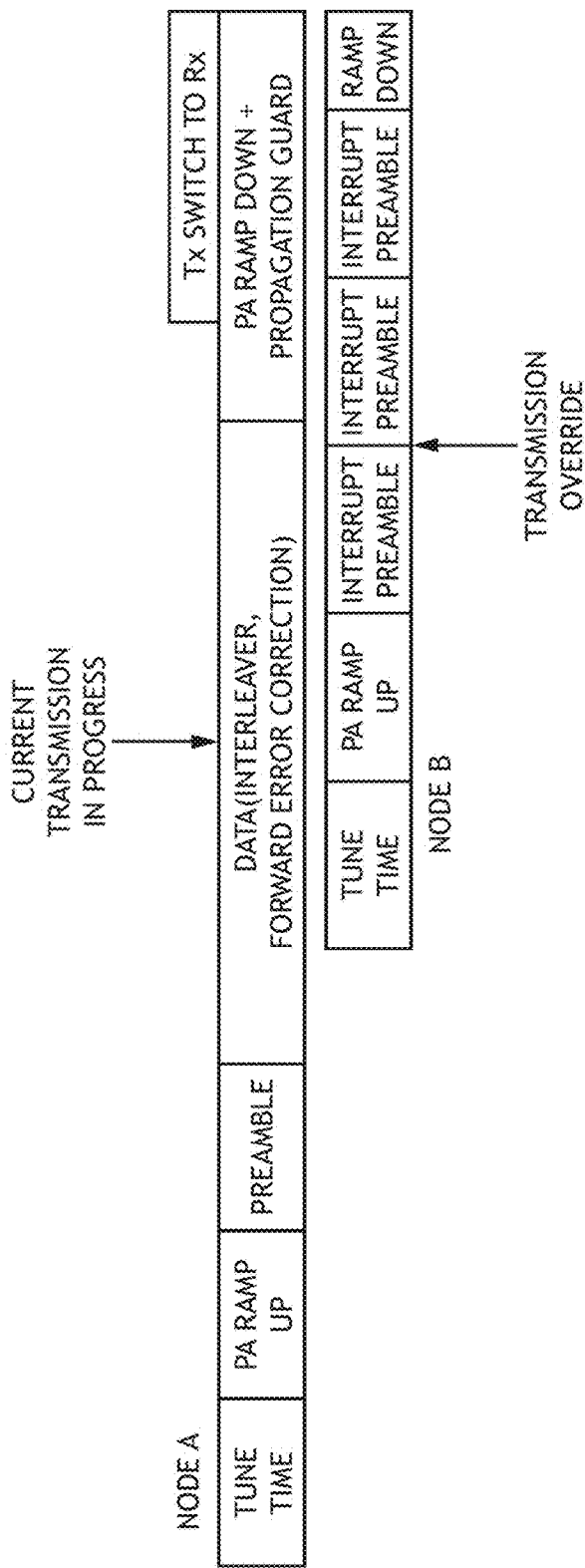
FIG. 5 is an illustration depicting a slot and frame structure supporting an interrupt preamble according to an exemplary embodiment of the inventive concepts disclosed herein.

For instance, as shown in FIG. 5, as soon as node A finishes transmission, node A may switch to receive mode to see if an emergency interrupt preamble is received. If an interrupting node, node B, wants to interrupt the transmission in progress, node B may try to time its transmission such that the transmission lands in the propagation guard window of node A after the power amplifier ramp down. Node A (the transmitter), on hearing the interrupt preamble, knows that another transmission (likely a higher priority transmission) is being initiated so that node A may choose to remain in receive mode for the next slot. Node B (the interrupting node) may verify that node A (the transmitter) has stopped transmission and may start its own transmission in the next slot after sending the interruption preamble. In the event that node A (the transmitter) misses the interrupt preamble, node B (the interrupting node) may repeat this interruption process. It is noted that transmission turnaround can be achieved within 3 time slots in most cases. It is also noted that this interruption mechanism can also be used to preempt data transmission with voice. At the end of the interruption/preemption, the interrupting node may send an end of interrupt message so that normal operation with slot ownership can resume.

It is contemplated that networks configured in accordance with embodiments of the inventive concepts disclosed herein may address another issue associated with conventional networks that use contention based waveforms. That is, in a conventional network that uses a contention based waveform, voice communication is not possible unless the waveform can support digital voice. In a TDMA waveform based network, the TDMA HF waveform can support a mode where the incoming voice can be passed through a speech to text translator which can compress the incoming voice to as low as 64 bits per second text. The text may then be passed through a text to speech converter at the receiving end. It is noted that speech to text and text to speech conversions may be carried out in real-time. It is contemplated that there may be a need to clean up incoming voice before the voice to speech conversion. This can be accommodated by filtering out unwanted noise (e.g., using various types of noise cancellation techniques) from the incoming speech before converting it to text.

It is also contemplated that there may be a need to communicate using a coded list of speech commands (e.g., when operating in stealthy environments). In some embodiments, a transmitting node may allow an operator to speak the commands and the speech to text converter of the transmitting node may detect the appropriate command and provide a coded digital code-word for transmission over the air. The coded digital code-word may then be converted back to a speech command at the receiving end. It is noted that the ability to operate in this manner may be appreciate in various types of operating conditions and it only requires less than 16 bits per second throughput.

It is contemplated that networks configured in accordance with embodiments of the inventive concepts disclosed herein may also provide network awareness to the participating nodes, which is another feature missing in conventional contention based waveform networks. More specifically, since HF communications are typically point to point, the nodes generally have no awareness of other nodes in the area. The lack of awareness makes it very difficult for mission operators, commanders, as well as other interested parties to determine what is happening in the field.

It is contemplated that a spectrum harvesting tool may be utilized to help address these network awareness issues. A spectrum harvesting tool may be configured to analyze and characterize a particular spectrum. Some of the characterizations provided may include unused frequencies, used frequencies, as well as characteristics of used frequencies like noise floor, channel bandwidth occupied, modulation used, symbol rate, average on time, and the like. It is contemplated that spectrum harvesting tools may be integrated into the various participating nodes to provide real-time network awareness.

In some embodiments, a participating node may include one or more processors serving as a topology manager that runs the spectrum harvesting tool to characterize the HF spectrum in real-time. The spectrum harvesting tool may detect the presence of an emitter by detecting the energy emitted by it. Since the TDMA HF waveform uses unique preambles (determined using a pseudorandom code that is dependent on the time-varying slot number) in every time slot, the waveform is able to inform the topology manager of the preambles used one time slot in advance. The topology manager may forward all active preambles to the spectrum harvesting tool, which may use the information to detect the presence of participating nodes.

It is contemplated that the number of nodes that can be tracked may be dependent on the processing resources available. It is also contemplated that if the node is a fixed site High Frequency Global Communications System (HF-GCS) nodes, for example, the spectrum harvesting tool running on that node may be configured to track many nodes in real-time. While it is recognized that information from some nodes may not propagate to all fixed site HFGCS nodes, it is to be understood that information collected from the various HFGCS nodes may be merged to provide mission commanders a very reliable world-wide view of operational nodes in the field. It is also to be understood that utilizations of spectrum harvesting tools are not limited to fixed site nodes. It is contemplated that non-fixed site nodes (e.g., mobile nodes) may also be equipped with spectrum harvesting tools configured to operate in similar manners without departing from the broad scope of the inventive concepts disclosed herein. In some embodiments, for instance, it may be desirable to equip a set (or a small subset) of mobile nodes with spectrum harvesting tools to fill in the gaps that cannot be covered by fixed site HFGCS nodes.

Figure 6:
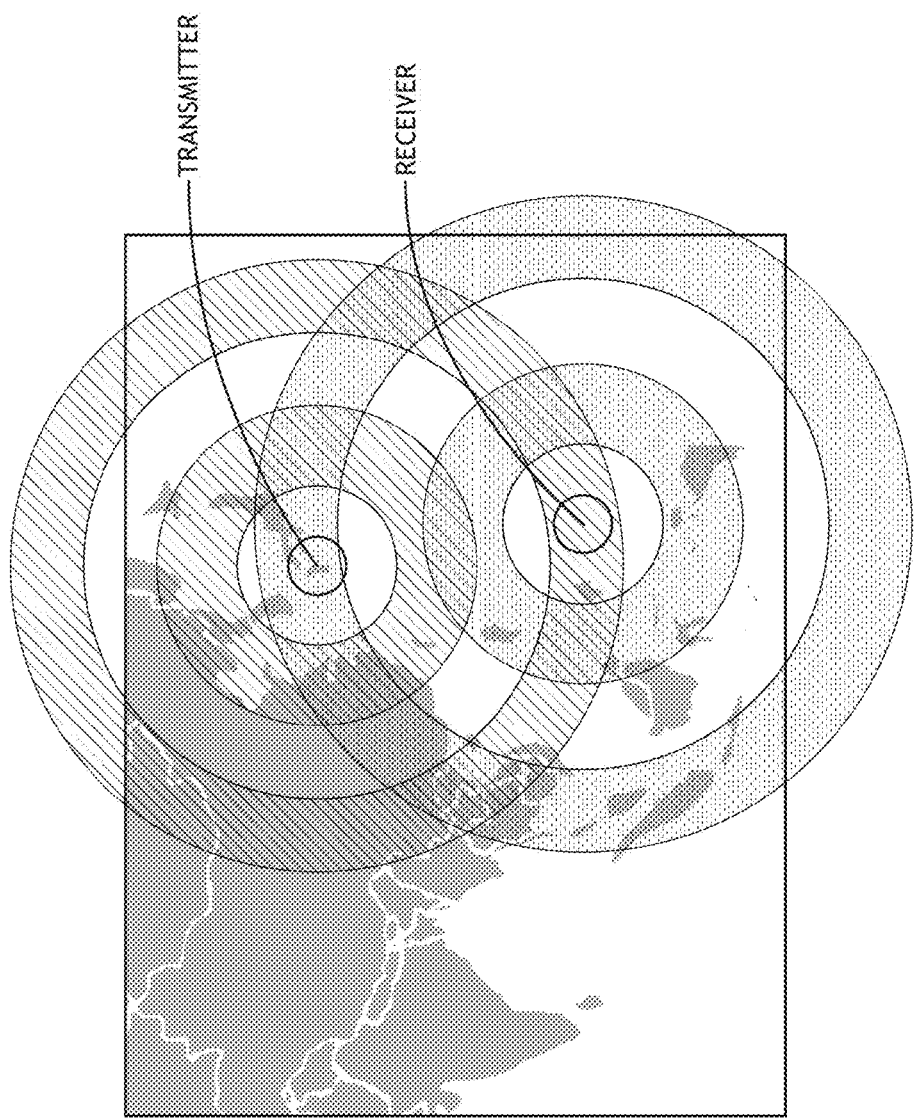
FIG. 6 is an illustration depicting communication ranges of beyond line of sight reflective communication devices.

It is contemplated that networks configured in accordance with embodiments of the inventive concepts disclosed herein may also support beyond line of sight, jammer-aware communications. Unlike traditional line of sight communications, beyond line of sight communications form communication ranges in the form of disjointed rings as shown in FIG. 6. The first ring, for example, may cover a distance of 0-400 nautical miles around the transmitter. This ring is typically referred to as the near vertical incidence skywave (NVIS) communication zone. The second ring may cover a distance between 900-1600 nautical miles. This ring may be referred to as the intermediate range communication zone. The third ring may cover a distance between 2000-3000 nautical miles. This ring may be referred to as the long range communication zone. It is contemplated that waveforms configured in accordance with embodiments of the inventive concepts disclosed herein may take advantage of the fact that communication ranges are formed as disjointed rings to combat jamming.

For instance, when two nodes (a transmitter and a receiver) attempt to pick a frequency to facilitate their communication, they need to decide the frequency based on the distance to be covered (reflected as zones that intersect in FIG. 6). Additionally, the transmitter and the receiver may also be configured to take jammers into consideration. Each jammer may introduce three additional concentric rings, which may intersect with the rings of the transmitter and receiver. The transmitter and the receiver may recognize how jammers interest with their own rings and pick a frequency that is on an intersecting ring between the transmitter and receiver but does not intersect with the rings associated with the jammer. It is noted that in some instances, the frequency picked may be a suboptimal frequency for communication purposes; however, communicating on a suboptimal frequency at a lower data rate may still be better than communicating on an ideal frequency in the presence of one or more jammers. In the unlikely event that the jammer(s) can still jam communications on a frequency that does not intersect with the rings of the jammer(s), the transmitter and the receiver may choose to find a multi-hop path using intermediate relays such that the frequencies used are not jammable or are suboptimal for the jammers.

Figure 7:
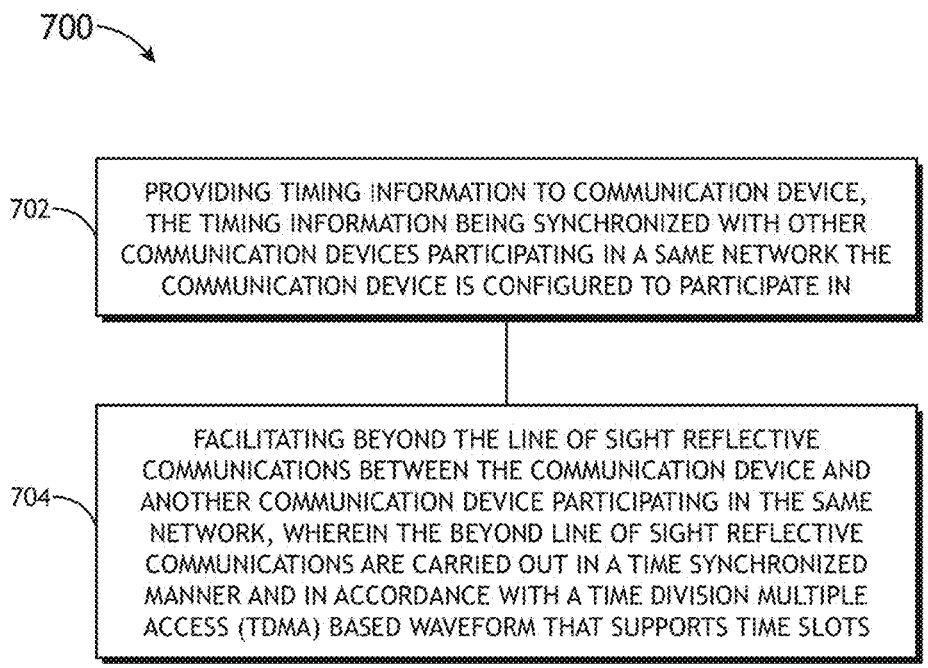
FIG. 7 is a flow diagram depicting an exemplary beyond line of sight reflective communication method according to an exemplary embodiment of the inventive concepts disclosed herein.

Referring now to FIG. 7, a flow diagram depicting an exemplary beyond line of sight reflective communication method 700 configured in accordance with the inventive concepts disclosed herein is shown. As depicted in FIG. 7, timing information may be provided to a communication device/node in a step 702. In some embodiments, the timing information may be synchronized with other communication devices/nodes participating in the same network. It is noted that providing synchronized timing information may allow beyond line of sight reflective communications to be established between two communication devices/nodes participating in the network. In some embodiments, the beyond line of sight reflective communications may be carried out in a time synchronized manner and in accordance with a TDMA based waveform that supports time slots.

As will be appreciated from the above, networks configured in accordance with embodiments of the inventive concepts disclosed herein are configured to utilize TDMA based waveforms, which are capable of supporting a large number of nodes participating in beyond line of sight reflective communications and are capable of providing a variety of desirable features missing in conventional systems using contention based waveforms.

It is contemplated that communication devices/nodes configured in accordance with embodiments of the inventive concepts disclosed herein may be install on various types of mobile platforms and/or vehicles, including land vehicles, watercraft (e.g., ships, boats), aircraft, and spacecraft.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A communication device, comprising:
    a time source configured to provide timing information for the communication device, the timing information being synchronized with other communication devices participating in a same network the communication device is configured to participate in; and
    one or more processors in communication with the time source, the one or more processors configured to facilitate beyond line of sight reflective communications between the communication device and another communication device participating in the same network, wherein the beyond line of sight reflective communications are carried out in a time synchronized manner and in accordance with a time division multiple access (TDMA) based waveform that supports time slots, wherein the one or more processors are further configured to periodically broadcast a location update message on all frequencies specified in a frequency pick list, the location update message includes information regarding the communication device and information regarding direct connection neighbors of the communication device.

2. The communication device of claim 1, wherein time source is a navigation satellite system based synchronized time source.

3. The communication device of claim 2, further comprising:
    an additional time source configured to provide additional timing information to maintain operations of the communication device when the synchronized time source fails.

4. The communication device of claim 1, wherein each slot contained in the TDMA based waveform includes a uniquely determined preamble.

5. The communication device of claim 1, wherein the one or more processors are further configured to receive one or more location update messages from other communication devices participating in the same network and track locations of the other communication devices at least partially based on the location update messages.

6. The communication device of claim 1, wherein the TDMA based waveform supports an interrupt preamble configured to inform the communication device to remain in receive mode after the communication device completes current transmission.

7. The communication device of claim 1, wherein the one or more processors are further configured to select a frequency that facilitates beyond line of sight reflective communications between the communication device and the other communication device, wherein the frequency is selected to avoid communication ranges that intersect with communication ranges of one or more jammers.

8. A beyond line of sight reflective communication system, comprising:
   a plurality of communication nodes, each particular communication node of the plurality of communication nodes comprising:
      a time source configured to provide timing information for the particular communication node, the timing information being synchronized with time sources of the rest of the plurality of communication nodes; and
      one or more processors in communication with the time source, the one or more processors configured to facilitate beyond line of sight reflective communications between the particular communication node and another communication node, wherein the beyond line of sight reflective communications are carried out in a time synchronized manner and in accordance with a time division multiple access (TDMA) based waveform that supports time slots, wherein the TDMA based waveform supports an interrupt preamble configured to inform the particular communication node to remain in receive mode after the particular communication node completes current transmission.

9. The communication system of claim 8, wherein time source is a navigation satellite system based synchronized time source.

10. The communication system of claim 9, wherein each particular communication node further comprises:
   an additional time source configured to provide additional timing information to maintain operations of the particular communication node when the synchronized time source fails.

11. The communication system of claim 8, wherein each slot contained in the TDMA based waveform includes a uniquely determined preamble.

12. The communication system of claim 8, wherein the one or more processors are further configured to periodically broadcast a location update message on all frequencies specified in a frequency pick list.

13. The communication system of claim 12, wherein the location update message includes information regarding the particular communication node and information regarding direct connection neighbors of the communication node.

14. The communication system of claim 13, wherein the one or more processors are further configured to receive one or more location update messages from other communication nodes participating in the same network and track locations of the other communication nodes at least partially based on the location update messages.

15. The communication system of claim 14, wherein the plurality of communication nodes includes a plurality of fixed site nodes configured to track location of other communication nodes to provide a world-wide view of locations of the plurality of communication nodes.

16. The communication system of claim 8, wherein the one or more processors are further configured to select a frequency that facilitates beyond line of sight reflective communications between the particular communication node and the other communication node, wherein the frequency is selected to avoid communication ranges that intersect with communication ranges of one or more jammers.

17. A communication device, comprising:
   a time source configured to provide timing information for the communication device, the timing information being synchronized with other communication devices participating in a same network the communication device is configured to participate in; and
   one or more processors in communication with the time source, the one or more processors configured to facilitate beyond line of sight reflective communications between the communication device and another communication device participating in the same network, wherein the beyond line of sight reflective communications are carried out in a time synchronized manner and in accordance with a time division multiple access (TDMA) based waveform that supports time slots, wherein the TDMA based waveform supports an interrupt preamble configured to inform the communication device to remain in receive mode after the communication device completes current transmission.

18. A beyond line of sight reflective communication system, comprising:
   a plurality of communication nodes, each particular communication node of the plurality of communication nodes comprising:
      a time source configured to provide timing information for the particular communication node, the timing information being synchronized with time sources of the rest of the plurality of communication nodes; and
      one or more processors in communication with the time source, the one or more processors configured to facilitate beyond line of sight reflective communications between the particular communication node and another communication node, wherein the beyond line of sight reflective communications are carried out in a time synchronized manner and in accordance with a time division multiple access (TDMA) based waveform that supports time slots, wherein the one or more processors are further configured to periodically broadcast a location update message on all frequencies specified in a frequency pick list, the location update message includes information regarding the particular communication node and information regarding direct connection neighbors of the communication node.

* * * * *